United States Patent
Ng et al.

(10) Patent No.: US 8,160,812 B1
(45) Date of Patent: Apr. 17, 2012

(54) TRACKING AND GUIDANCE ARCHITECTURE AND METHOD

(75) Inventors: Sei Y. Ng, Olathe, KS (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 743 days.

(21) Appl. No.: 11/851,200

(22) Filed: Sep. 6, 2007

(51) Int. Cl.
*G08G 1/123* (2006.01)
*G06F 17/00* (2006.01)
*G01C 21/34* (2006.01)
*G01C 21/00* (2006.01)

(52) U.S. Cl. ........ 701/408; 701/409; 701/425; 701/426; 340/995.1; 340/995.14; 340/995.16; 340/995.27

(58) Field of Classification Search .......... 701/200, 701/201, 202, 206, 207, 208, 209, 210, 211, 701/213, 300, 400, 408, 409, 410, 411, 412, 701/418, 419, 425, 426, 428, 431, 439, 532, 701/537, 538; 340/988, 989, 990, 991, 992, 340/993, 995.1, 995.12, 995.14, 995.16, 340/995.17, 995.19, 995.23–995.25
See application file for complete search history.

(56) References Cited

U.S. PATENT DOCUMENTS

| | | | | |
|---|---|---|---|---|
| 5,915,003 A * | 6/1999 | Bremer et al. | ............. | 379/93.19 |
| 6,175,801 B1 * | 1/2001 | Millington | ................... | 701/207 |
| 2004/0158390 A1 * | 8/2004 | Mukaiyama | .................. | 701/200 |
| 2006/0227047 A1 * | 10/2006 | Rosenberg | ............... | 342/357.13 |
| 2008/0209332 A1 * | 8/2008 | Chevsky et al. | ............. | 715/736 |

* cited by examiner

*Primary Examiner* — Jack W Keith
*Assistant Examiner* — Edward Pipala (57) ABSTRACT

A tracking and guidance system is provided. The system comprises a first device configured to transmit a location of the first device. The system further comprises a second device configured to receive the location from the first device, to display the location on a common map view, to receive inputs comprising a drawn directional data and a verbal directional data, and to transmit the drawn and verbal directional data to the first device, wherein the drawn and verbal directional data is received by the first device and the drawn directional data is displayed on the common map view displayed by the first device.

20 Claims, 7 Drawing Sheets

TRACKING AND GUIDANCE ARCHITECTURE AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Navigation systems exist that assist a driver by providing a programmed map and programmed verbal directions. However, these navigation systems provide no interaction with a live person and may employ outdated programmed maps and verbal directions. In some systems, a driver may be assisted by a live person tracking the driver's location and providing verbal directions. In this system, however, the driver is not presented with a map and the live person may be relying on an outdated map or may not have the local knowledge to give the driver accurate directions.

SUMMARY

In one embodiment, the disclosure includes a tracking and guidance system. The system comprises a first device. The system further comprises a second device configured to receive a location of the first device, to display the location on a common map view, to receive inputs comprising a drawn directional data and a verbal directional data, and to transmit the drawn and verbal directional data to the first device, wherein the drawn and verbal directional data is received by the first device and the drawn directional data is displayed on the common map view displayed by the first device.

In another embodiment, the disclosure includes a method of providing directions to a mobile user. The method comprises receiving a location of a first device by a second device, displaying the location on a common map view displayed by the second device, providing a drawn directional data on the common map view and a verbal directional data, transmitting the drawn and verbal directional data from the second device to the first device, and displaying the drawn directional data on the common map view displayed by the first device.

In yet another embodiment, the disclosure includes a tracking and guidance system. The system comprises a database configured to store completed routes, travel times, and feedbacks. The system also comprises a first terminal configured to transmit a location of the first terminal and a desired destination of the first terminal. The system further comprises a server configured to receive the location of the first terminal and the desired destination of the first terminal, to retrieve completed routes from the database, to analyze at least portions of the completed routes, and to transmit to the first terminal a recommended route to the desired destination, wherein the recommended route to the desired destination is received by the first device and displayed on a map view displayed by the first device.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Several embodiments of a tracking and guidance system are taught that provide a driver with directions. This disclosure relates to a mobile device communicating with a second device to obtain, in one embodiment, directions based on local knowledge, for example a driver of a vehicle communicating with a friend of family member who has knowledge of local road conditions or directions to some business. The location of the mobile device associated with the driver is displayed on a common map view that may be presented on the mobile device and the second device. The common map view that is presented to the mobile device and the second device may differ in some aspects, and may share some basic information. For example, the same map view, a scaled down or up version of each other, a skewed left or right version of each other, or a skewed up or down version of each other. The driver is able to see drawn directional data such as a route, a landmark, or a symbol on the common map view presented on the mobile device which may have been entered or provided by the friend or family member on the common map view presented on the second device. For example, the friend who knows local road conditions may view the location of the driver on the common map view and realize or have knowledge that a certain street is temporarily blocked, in which case the friend could indicate this blockage to the driver by adding a symbol, for example some form of drawn symbol, to the common map view. Once the friend has input the drawn indication of road blockage to the common map view on the second device, the drawn directional data is transmitted to the mobile device where it is presented to the driver on the common map view displayed by the mobile device. The drawn directional data may also be stored on a server. Thus, if another mobile device does not have access to a source of local knowledge, for example a local friend familiar with area streets, the other mobile device may contact the server, which has access to the completed routes given to mobile devices provided by second devices with local insight and personal knowledge of the area, to obtain a recommended route to a desired destination.

Figure 1:
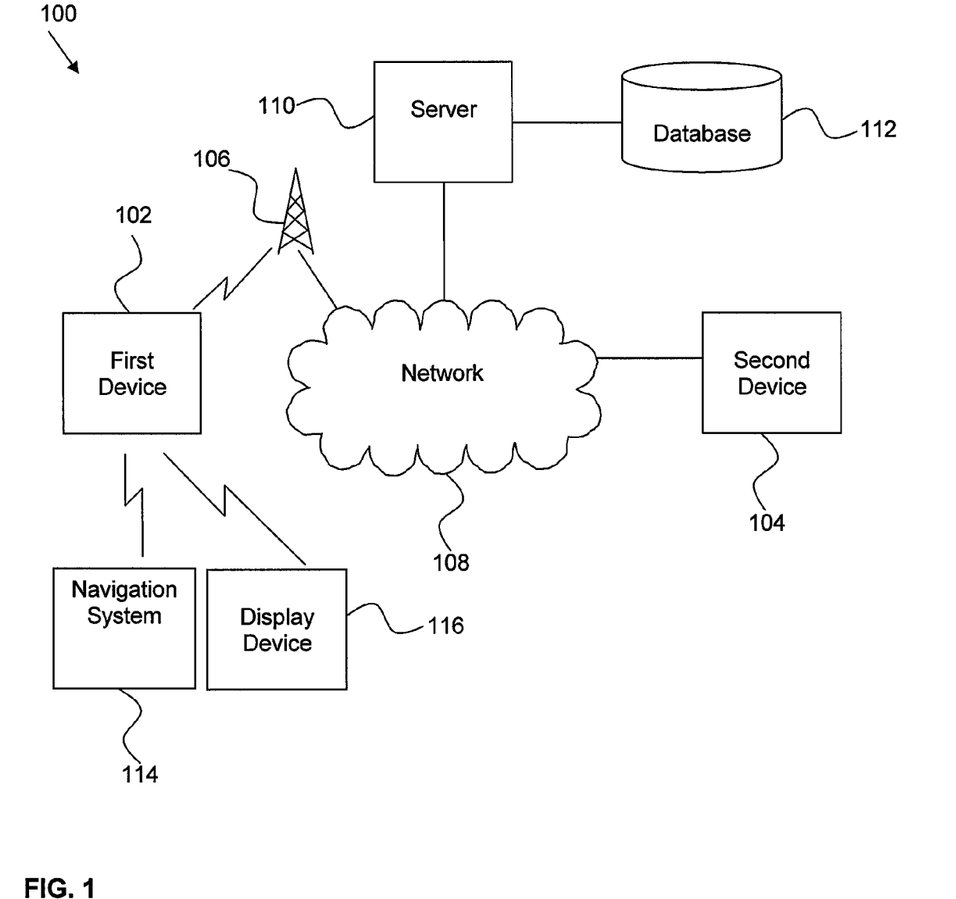
FIG. 1 is a block diagram of a system according to an embodiment of the disclosure.

Turning to FIG. 1, a tracking and guidance system 100 comprises a first device 102, a second device 104, a wireless base station 106, a network 108, a server 110, and a database 112. In some embodiments the system 100 may comprise additional components, for example a navigation system 114 and/or a display device 116.

The first device or terminal 102 is associated with a driver of a vehicle and may be, for example, a cell phone, a personal data assistant (PDA), a laptop computer, or other electronic device. A handset suitable for some embodiments of the first device 102 is described in more detail hereinafter. The first device 102 is able to communicate with the network 108, for example via wireless communications with a wireless base station 106 and from the wireless base station 106 to the network 108. In an embodiment, the first device 102 is capable of determining its own location through the use of a global positioning system (GPS) receiver within the first device 102 or by other means of determining position. The first device 102 then communicates its own location to other devices, for example to the second device 104 and/or to the server 110. The first device 102 occasionally sends updates of its location to the second device 104 and/or the server 110. In an embodiment, the second device 104, which is receiving the updates of the location of the first device 102, continually monitors the progress of the first device 102 and provides timely feedback to the first device 102 such as informing the first device 102 that they just made an incorrect turn. In another embodiment, the first device 102 may communicate both its own location and a desired destination, for example an address of a restaurant, to the sever 110.

The second device or terminal 104 may be a personal computer (PC), a laptop computer, a cell phone, a PDA, or some other electronic device. The second device 104 may also be any general purpose computer system as discussed in greater detail hereinafter. The second device 104 has communications connectivity to the network 108. While described and illustrated as communicating with the network 108 without a wireless base station, in an embodiment the second device 104 may communicate with the network 108 via a wireless base station or a wireless access point. In another embodiment, the second device 104 may communicate with the network 108 via the wireless base station 106, for example when the second device 104 and the first device 102 share the same coverage area of the wireless base station 106 or when the second device 104 roams into the coverage area of the wireless base station 106. A user may employ the second device 104 to coach or provide directional assistance to the first device 102, for example providing drawn directional data and verbal directional data. In an embodiment, a user employing the second device 104 may have local insight and personal knowledge of the area in which the first device 102 is located. In another embodiment, the user employing the second device 104 may be chosen to provide assistance via the system 100 because they have better navigation skills or because they have a more calm and collected disposition. For example, the driver of a vehicle may be running late for a business appointment, may become flustered by the stress of the situation, and may benefit from receiving directions from a friend who may not have greater knowledge of local conditions but is not burdened by the stress of running late for an appointment and hence may be thinking more clearly.

The second device 104 receives the location of the first device 102 through the network 108 via the wireless base station 106. The location of the first device 102 is then displayed on a common map view displayed by the second device 104. The second device 104 may then receive drawn directional data and display the drawn directional data on the common map view. The drawn directional data may include a route, a symbol, a landmark, a guidepost, or any other guidance for the first device 102. The drawn directional data may be drawn using a mouse, a stylus pen, a touch pen, an electronic pen, an ultrasonic pen, an optical grid, a notepad, a tablet, a touch screen, a touch pad, or other input device. The drawn directional data, along with the verbal directional data received by the second device 104 is then transmitted to the first device 102 through the wireless base station 106 via the network 108. The verbal directional data may be transmitted through a voice traffic channel and the drawn directional data may be transmitted through a separate data channel or a single channel may be used to transmit both the verbal and drawn directional data. The first device 102 receives the verbal and drawn directional data and displays the drawn directional data on the common map view displayed by the first device 102.

The common map view is a shared map view between the first device 102 and the second device 104. The common map view shared between the first device 102 and the second device 104, which may differ in some aspects, shares some basic information, for example an indication of the position of the first device 102 relative to a street map. For example, the common map view displayed on the first device 102 may be a scaled down version or a scaled up version of the common map view on the second device 104. In another example, the common map view displayed on the first device 102 may be a skewed left or right or skewed up or down version of the common map view on the second device 104. In any case, the common map view shared between the first device 102 and the second device 104 will likely be substantially similar in that both would relay the appropriate directional data.

The wireless base station 106 may be any cellular wireless base station known to those skilled in the art, for example a Code Division Multiple Access (CDMA) cellular wireless base station, a Global System for Mobile Communications (GSM) cellular wireless base station, a World-wide Interoperable Microwave Access (WiMAX) base station, a WiFi access point, or other wireless access device. The wireless base station 106 is in communication with the network 108, for example through wired communication links.

The network 108 is a communications network comprising various wired and wireless technologies well known to those skilled in the art. The network 108 may supply a variety of communications services or forms of communication including email communication, text message communication, voice traffic communication, web content communication, multimedia communication, map content communication, and other communication services and communication content.

The server 110 may be any general purpose computer system, as discussed in greater detail hereinafter. The server 110 may comprise a single computer or a plurality of computers. The server 110 may comprise a plurality of computers at different places, for example to provide geographical diversity. The server 110 executes one or more applications that provide to the first device 102 a recommended route to a desired destination when requested by the first device 102, for example receiving the location of the first device 102, receiving the desired destination of the first device 102, retrieving completed routes from the database 112, analyzing the completed routes based on time and feedback, selecting one of the completed routes or combinations of the completed routes, and transmitting a recommended route to the desired destination to the first device 102.

The database 112 stores information and makes information available to the server 110. The information may include the completed routes provided by the first device 102 or provided by the second device 104. The information may additionally include verbal directional data provided by the second device 104. In an embodiment, the verbal cues are recorded as audio clips. The information may also include a travel time of the completed route or for portions of the completed route. For example, in an embodiment a model may be associated with, may underlay, or may compose the common map which provides some form of grid or graph that can abstractly represent a path as the serial combination of an ordered sequence of arcs connecting nodes of the grid or graph. The travel time may be stored as the time to travel each of the arcs that compose the path traveled by the driver and or the first device 102. The information may further consist of a feedback on the completed route. For example, the first device 102 could provide feedback to the server 110 about the particular route inputted with a button on the first device 102 that selects great, fair, or terrible. In another example, the first device 102 could provide feedback to the server 110 about a particular route by rating the route from one star to five stars inputted with a button on the first device 102. In yet another example, the first device 102 could provide feedback to the server 110 about a particular route by providing comments, such as "road closed due to construction". The information may also include time of day and day of the week.

The database 112 may be one or more databases. In an embodiment, the database 112 may be composed of multiple databases, for example a first database containing the completed routes, a second database containing the time of the completed routes, and a third database containing the feedback about the completed routes.

The server 110 communicates with the database 112 through any of a variety of communications means. The server 110 has communications connectivity to the network 108. The server 110 also has connectivity to the first device 102 through the wireless base station 106 via the network 108.

The navigation system 114 includes any of the navigation systems that are currently available or any of the navigation systems that will be available in the future. The navigation system 114 contains pre-programmed maps, displays a map of the location versus a local street grid, accepts a destination, determines a preferred route to the destination, and provides pre-programmed voice and graphical direction cues. The navigation system 114 does not interact with a live person. Also, the navigation system 114 has limited local knowledge that results from the use of pre-programmed maps and verbal directions that may be outdated.

The navigation system 114 is in communication with the first device 102 via a Bluetooth or other wireless or wired link. In an embodiment, the navigation system 114 receives the drawn directional data from the first device 102 and displays the drawn directional data on the screen of the navigation system 114 such that the navigation system 114 is coordinated with the drawn directional data transmitted by the first device 102 provided by either the second device 104 or the server 110. The navigation system 114 may be controlled by the first device 102, for example using an application program interface (API), to present the common map view. The common map view displayed by the navigation system 114 may have a different appearance from the common map view presented on the first device 102, for example different colors or different conventions for representing streets and other map artifacts, but may share a common orientation and focus with the common map view presented on the first device 102. It is noted that the first device 102 and the navigation system 114 are expected to be substantially co-located, for example used in the same vehicle.

In an embodiment, the first device 102 may be able to control the navigation system 114 to present the common map view at an appropriate level of detail or granularity based on the common map view currently displayed on the first device 102. This level of detail or granularity may be different from that of the first device 102 because of the greater size of the display of the navigation system 114. In another embodiment, the navigation system 114 verbally directs the driver associated with the first device 102 according to the drawn directional data given by the second device 104 or the server 110. For example, the navigation system 114 may direct taking an exit and then turning right because the drawn directional data so indicates. Coordinating the directional data given by the second device 104 or the server 110 with the navigation system 114 is advantageous in that the navigation system 114 will harmonize with the drawn directional data displayed on the first device 102. The navigation system 114 may harmonize with the drawn directional data displayed on the first device 102 by displaying the drawn directional data and/or verbally directing the driver associated with the first device 102 according to the drawn directional data. The navigation system 114 may not be used in some embodiments.

The display device 116 may be a laptop computer, a PDA, or some other electronic device. The display device 116 communicates with the first device 102 through a WiFi, Bluetooth, or other wireless or wired link. In an embodiment, both the first device 102 and the display device 116 may display the drawn directional data on the common map view at about the same time. The display device 116 receives the drawn directional data from the first device 102 and displays the drawn directional data on the common map view displayed by the display device 116. In an embodiment, the display device 116 may provide a larger more readily viewed display of the common map view and drawn directional data than the first device 102. The display device 116 may not be used in some embodiments, and the common map view is presented or displayed on the first device 102.

Figure 2:
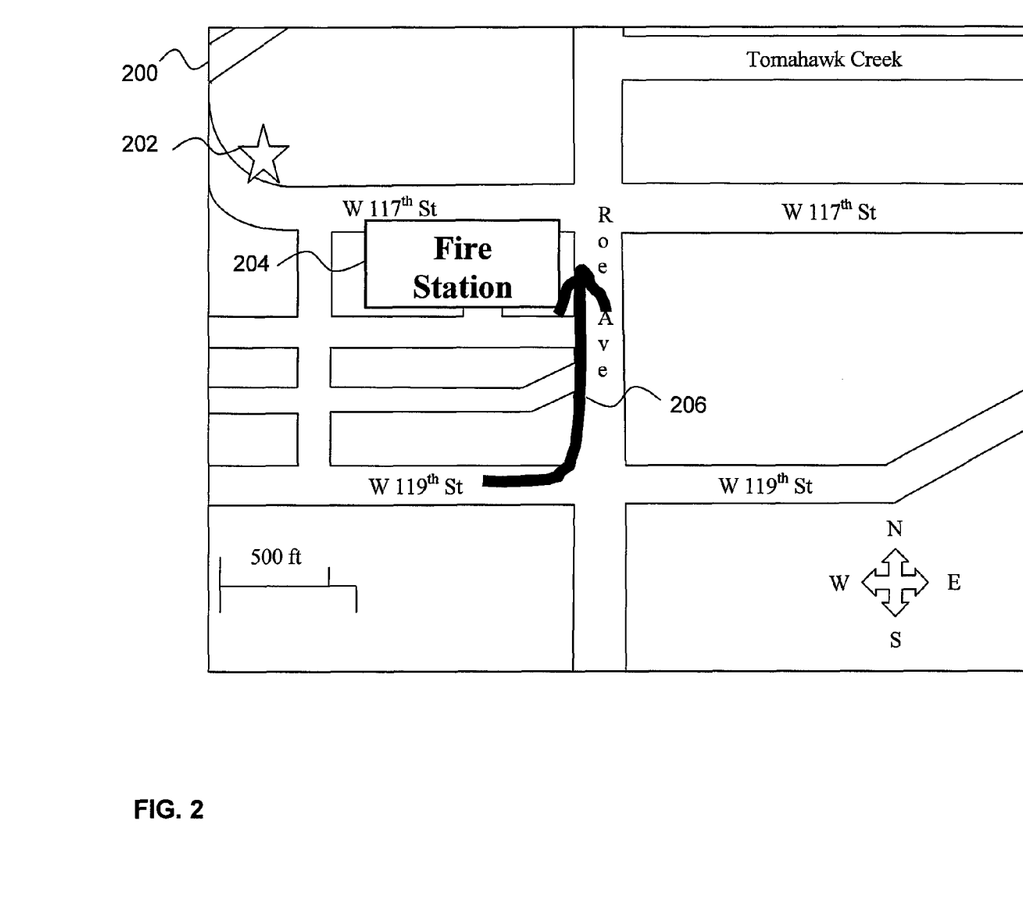
FIG. 2 is an illustration of a common map view with drawn directional data.

FIG. 2 illustrates a common map view with drawn directional data. In an embodiment, the common map view 200 is displayed on the first device 102 and includes drawn directional data. The drawn directional data may be provided by the second device 104 and may be a route, a symbol, a landmark, a guidepost, or any other item that would provide guidance. The star 202, the fire station 204, and the arrow 206 are examples of drawn directional data. In an embodiment, verbal directional data accompanies the drawn directional data. For example, concurrently with providing the star 202, the second device 104 may provide verbal directional data such as "the store is on the back side of the building". In another example, concurrently with providing the fire station 204, the second device 104 may provide verbal directional data such as "turn left at the fire station".

Figure 3:
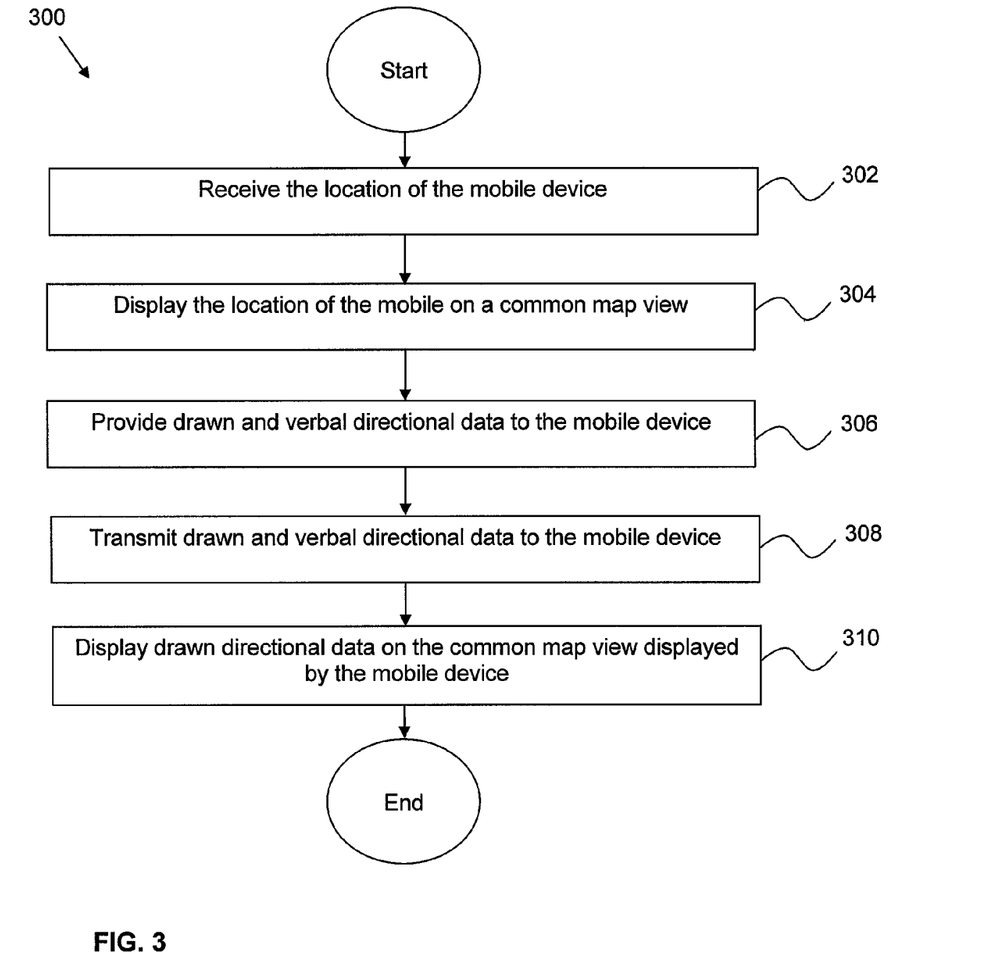
FIG. 3 is a flow chart illustrating a method according to an embodiment of the disclosure.

FIG. 3 illustrates a method 300 of providing guidance in accordance with embodiments of the disclosure. The method 300 begins at block 302 where the location of a mobile device, for example the first device 102, is received, for example by the second device 104 through the network 108 via the wireless base station 106.

At block 304, the location of the mobile device is displayed on a common map view. At block 306, drawn and verbal directional guidance are provided. In an embodiment, a user associated with the second device 104 provides drawn directional data on the common map view. The drawn directional data may be a route, a symbol, a landmark, a guidepost, or any other item that would provide guidance. The drawn directional data may be drawn using a mouse, a stylus pen, a touch pen, an electronic pen, an ultrasonic pen, an optical grid, a notepad, a tablet, a touch screen, a touch pad, or other input device.

At block 308, the drawn and verbal directional data is transmitted to the mobile device, for example through the network 108 via the wireless base station 106. At block 310, the drawn directional data is displayed on the common map displayed by the mobile device, for example the first device 102. In an embodiment, the drawn directional data and the verbal directional data may also be stored in the database 112 so that a driver associated with the first device 102 can contact the server 110 to request a recommended route to a desired destination.

Figure 4:
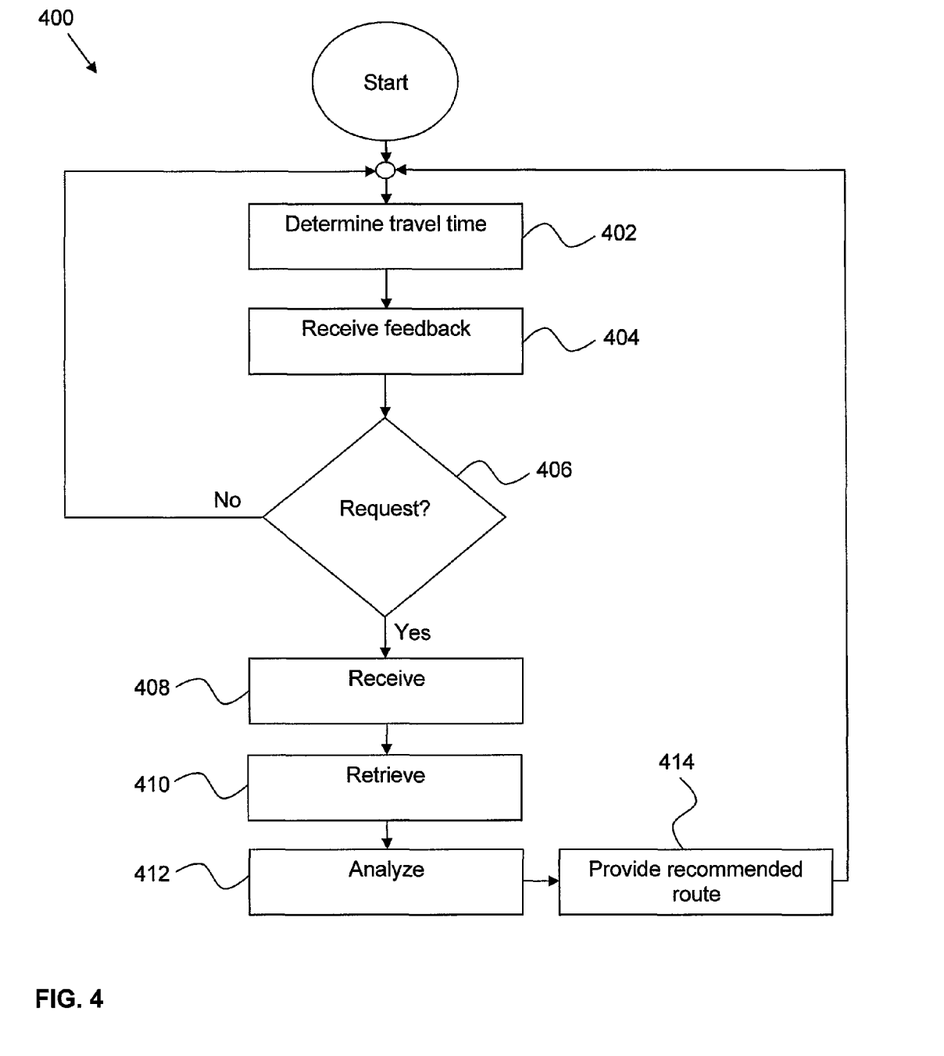
FIG. 4 is a flow chart illustrating another method according to an embodiment of the disclosure.

FIG. 4 illustrates another method 400 of providing guidance in accordance with embodiments of the disclosure. The method 400 begins at block 402 where a travel time associated with a completed route is determined, for example by the server 110. In an embodiment, the travel time is the amount of time taken to travel a completed route. The completed route may have been transmitted to the first device 102 by the second device 104 or by the server 110. At block 404, feedback about the completed route is received, for example by the server 110 from the first device 102. In an embodiment, the first device 102 could provide feedback to the server 110 about the particular route inputted with a button on the first device 102 that selects great, fair, or terrible. In another embodiment, the first device 102 could provide feedback to the server 110 about a particular route by rating the route from one star to five stars inputted with a button on the first device 102. In yet another embodiment, the first device 102 could provide feedback to the server 110 about a particular route by providing comments, such as "road closed due to construction". In an embodiment, the travel time and the feedback are stored in the database 112.

In another embodiment, the first device 102 or other device may provide feedback to the server 110 as travel time, time of day, and day of week on each of the portions or segments of a route traveled. For example, a model or graph composed of a number of nodes may underlay or be associated with an area, for example a city, such that a route traveled over streets may be represented or approximated by an ordered sequence of paths or arcs between the nodes composing the model or graph. This model or graph may be readily linked or associated with the common map view. The first device 102 may provide feedback on travel times over the arcs that approximate or represent an actual driving route to the server 110. In this way, valuable information may be accumulated for sharing with other drivers who may not follow the complete driven route of a driver, for example the driver associated with the first device 102, but whose route may be at least approximated by a combination of segments of other routes.

At block 406, if a request for guidance is made to the server 110, the method proceeds to block 408. At block 408, the server 110 receives information, for example from the first device 102. The information may include the location of the first device 102 and the desired destination of the first device 102. At block 410, the server 110 retrieves information, for example completed routes, times, and feedbacks from the database 112. At block 412, the server 110 analyzes the retrieved information. In an embodiment, the server 110 analyzes the completed routes based upon their associated travel time and feedback. At block 414, the server 110 provides a recommended route to the first device 102 that sent the request based upon the analysis of the travel times and feedbacks associated with the completed routes. In an embodiment, the recommended route to the desired destination is displayed on the common map view displayed by the first device 102. The recommended route to the desired destination may be a completed route, a portion of the completed route, combinations of completed routes, and/or combinations of portions of completed routes.

Once the server 110 provides a recommended route to the desired destination to the first device 102, the method 400 returns to block 402 and the server 110 continues to receive travel times and feedbacks. If no request is made at block 406, the method 400 returns to block 402 and the server 110 continues to receive travel times and feedbacks.

Figure 5:
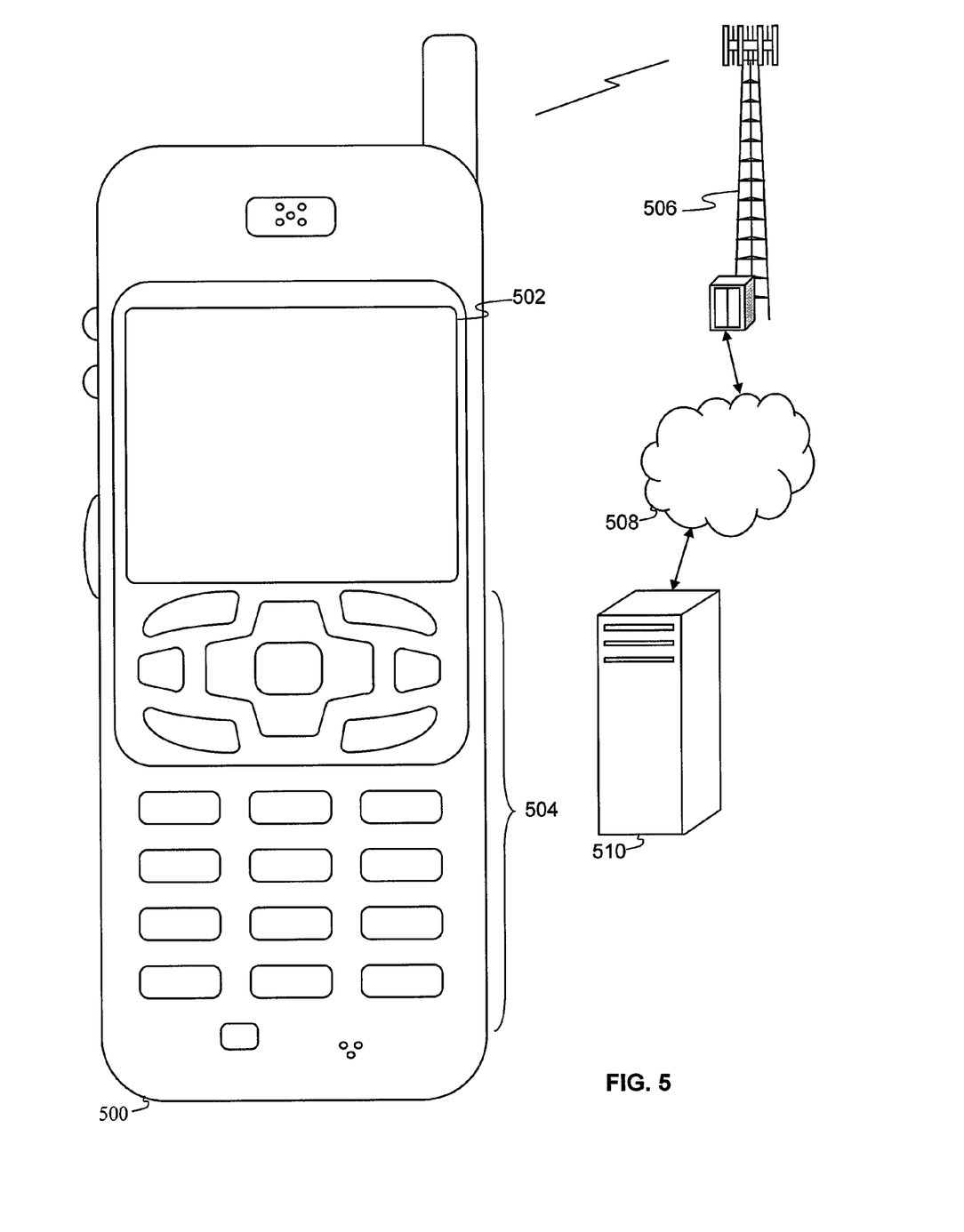
FIG. 5 is an illustration of a mobile device according to an embodiment of the disclosure.

Turning now to FIG. 5 a handset 500 is shown which is operable for implementing aspects of the present disclosure, but the present disclosure should not be limited to these implementations. For example, in an embodiment the handset 500 may be used to implement the first device 102 and/or the second device 104. Though illustrated as a mobile phone, the handset 500 may take various forms including a wireless handset, a pager, a personal digital assistant (PDA), a portable computer, a tablet computer, or a laptop computer. Many suitable handsets combine some or all of these functions. In some embodiments of the present disclosure, the handset 500 is not a general purpose computing device like a portable, laptop or tablet computer, but rather is a special-purpose communications device such as a mobile phone, wireless handset, pager, or PDA. The handset 500 may support specialized work assignments such as inventory control, job control, and/or task management functions.

The handset 500 includes a display 502 and a touch-sensitive surface or keys 504 for input by a user. The handset 500 may present options for the user to select, controls for the user to actuate, and/or cursors or other indicators for the user to direct. The handset 500 may further accept data entry from the user, including numbers to dial or various parameter values for configuring the operation of the handset. The handset 500 may further execute one or more software or firmware applications in response to user commands. These applications may configure the handset 500 to perform various customized functions in response to user interaction. Additionally, the handset 500 may be programmed and/or configured over-the-air, for example from a wireless base station, a wireless access point, or a peer handset 500.

The handset 500 may execute a web browser application which enables the display 502 to show a web page. The web page may be obtained via wireless communications with a cell tower 506, a wireless network access node, a peer handset 500 or any other wireless communication network or system. The cell tower 506 (or wireless network access node) is coupled to a wired network 508, such as the Internet. Via the wireless link and the wired network, the handset 500 has access to information on various servers, such as a server 510. The server 510 may provide content that may be shown on the display 502. Alternately, the handset 500 may access the cell tower 506 through a peer handset 500 acting as an intermediary, in a relay type or hop type of connection.

Figure 6:
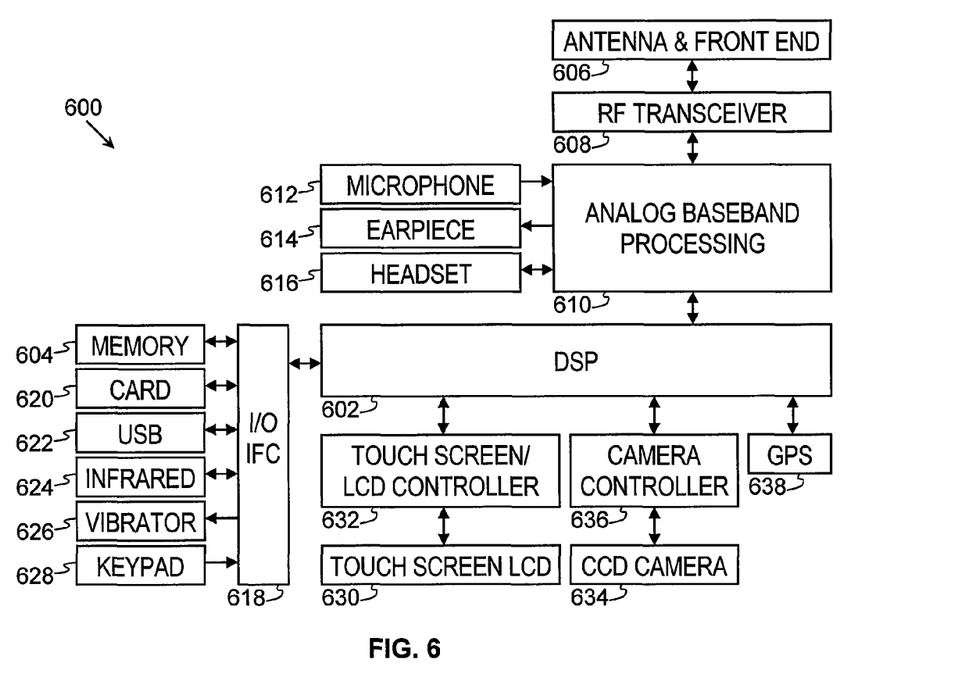
FIG. 6 is a block diagram of a mobile device according to an embodiment of the disclosure.

FIG. 6 shows a block diagram of the handset 600. While a variety of known components of handsets 600 are depicted, in an embodiment a subset of the listed components and/or additional components not listed may be included in the handset 600. The handset 600 includes a digital signal processor (DSP) 602 and a memory 604. As shown, the handset 500 may further include an antenna and front end unit 606, a radio frequency (RF) transceiver 608, an analog baseband processing unit 610, a microphone 612, an earpiece speaker 614, a headset port 616, an input/output interface 618, a removable memory card 620, a universal serial bus (USB) port 622, an infrared port 624, a vibrator 626, a keypad 628, a touch screen liquid crystal display (LCD) with a touch sensitive surface 630, a touch screen/LCD controller 632, a charge-coupled device (CCD) camera 634, a camera controller 636, and a global positioning system (GPS) sensor 638. In an embodiment, the handset 600 may include another kind of display that does not provide a touch sensitive screen. In an embodiment, the DSP 602 may communicate directly with the memory 604 without passing through the input/output interface 618.

The DSP 602 or some other form of controller or central processing unit operates to control the various components of the handset 600 in accordance with embedded software or firmware stored in memory 604 or stored in memory contained within the DSP 602 itself. In addition to the embedded software or firmware, the DSP 602 may execute other applications stored in the memory 604 or made available via information carrier media such as portable data storage media like the removable memory card 620 or via wired or wireless network communications. The application software may comprise a compiled set of machine-readable instructions that configure the DSP 602 to provide the desired functionality, or the application software may be high-level software instructions to be processed by an interpreter or compiler to indirectly configure the DSP 602.

The antenna and front end unit 606 may be provided to convert between wireless signals and electrical signals, enabling the handset 600 to send and receive information from a cellular network or some other available wireless communications network or from a peer handset 600. In an embodiment, the antenna and front end unit 606 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 606 may include antenna tuning and/or impedance matching components, RF power amplifiers, and/or low noise amplifiers.

The RF transceiver 608 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity the description here separates the description of this signal processing from the RF and/or radio stage and conceptually allocates that signal processing to the analog baseband processing unit 610 and/or the DSP 602 or other central processing unit. In some embodiments the RF transceiver 608, portions of the antenna and front end 606, the analog baseband processing unit 610 may be combined in one or more processing units and/or application specific integrated circuits (ASICs).

The analog baseband processing unit 610 may provide various analog processing of inputs and outputs, for example analog processing of inputs from the microphone 612 and the headset port 616 and outputs to the earpiece speaker 614 and the headset port 616. To that end, the analog baseband processing unit 610 may have ports for connecting to the built-in microphone 612 and the earpiece speaker 614 that enable the handset 600 to be used as a cell phone. The analog baseband processing unit 610 may further include a port for connecting to a headset or other hands-free microphone and speaker configuration. The analog baseband processing unit 610 may provide digital-to-analog conversion in one signal direction and analog-to-digital conversion in the opposing signal direction. In some embodiments at least some of the functionality of the analog baseband processing unit 610 may be provided by digital processing components, for example by the DSP 602 or by other central processing units.

The DSP 602 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 602 may perform modulation, coding, interleaving, and spreading and for a receiver function the DSP 602 may perform despreading, deinterleaving, decoding, and demodulation. In another embodiment, for example in an orthogonal frequency division multiplex access (OFDMA) technology application, for the transmitter function the DSP 602 may perform modulation, coding, interleaving, inverse fast fourier transforming, and cyclic prefix appending and for a receiver function the DSP 602 may perform cyclic prefix removal, fast fourier transforming, deinterleaving, decoding, and demodulation. In other wireless technology applications yet other signal processing functions and combinations of signal processing functions may be performed by the DSP 602.

The DSP 602 may communicate with a wireless network via the analog baseband processing unit 610. In some embodiments, the communication may provide Internet connectivity, enabling a user to gain access to content on the Internet and to send and receive e-mail or text messages. The input/output interface 618 interconnects the DSP 602 and various memories and interfaces. The memory 604 and the removable memory card 620 may provide software and data to configure the operation of the DSP 602. Among the interfaces may be the USB port 622 and the infrared port 624. The USB port 622 may enable the handset 600 to function as a peripheral device to exchange information with a personal computer or other computer system. The infrared port 624 and other optional ports such as a Bluetooth interface or an IEEE 802.11 compliant wireless interface may enable the handset 600 to communicate wirelessly with other nearby handsets and/or wireless base stations.

The input/output interface 618 may further connect the DSP 602 to the vibrator 626 that, when triggered, causes the handset 600 to vibrate. The vibrator 626 may serve as a mechanism for silently alerting the user to any of various events such as an incoming call, a new text message, and an appointment reminder.

The keypad 628 couples to the DSP 602 via the input/output interface 618 to provide one mechanism for the user to make selections, enter information, and otherwise provide input to the handset 600. Another input mechanism may be the touch screen LCD 630, which may also display text and/or graphics to the user. The touch screen LCD controller 632 couples the DSP 602 to the touch screen LCD 630.

The CCD camera 634 enables the handset 600 to take digital pictures. The DSP 602 communicates with the CCD camera 634 via the camera controller 636. The GPS sensor 638 is coupled to the DSP 602 to decode global positioning system signals, thereby enabling the handset 600 to determine its position. In another embodiment, a camera operating according to a technology other than Charge Coupled Device cameras may be employed. Various other peripherals may also be included to provide additional functions, e.g., radio and television reception.

Figure 7:
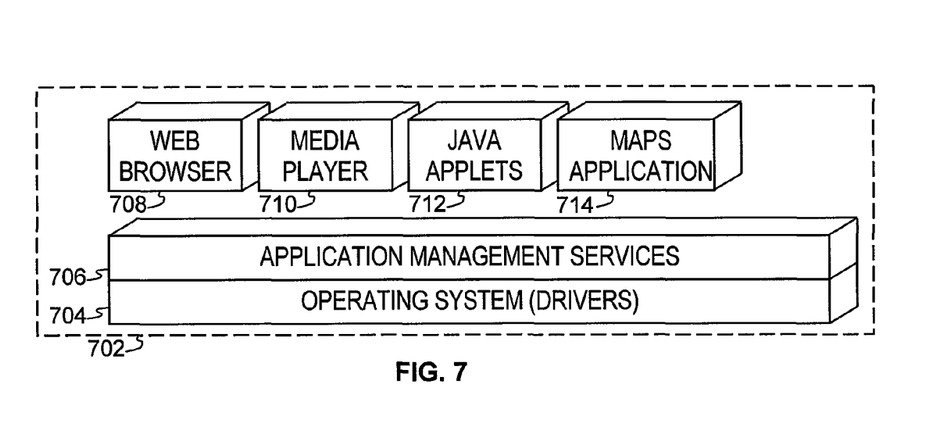
FIG. 7 is a block diagram of a software configuration for a mobile device according to an embodiment of the disclosure.

FIG. 7 illustrates a software environment 702 that may be implemented by the DSP 602. The DSP 602 executes operating system drivers 704 that provide a platform from which the rest of the software operates. The operating system drivers 704 provide drivers for the handset hardware with standardized interfaces that are accessible to application software. The operating system drivers 704 include application management services ("AMS") 706 that transfer control between applications running on the handset 600. Also shown in FIG. 7 are a web browser application 708, a media player application 710, and JAVA applets 712. The web browser application 708 configures the handset 600 to operate as a web browser, allowing a user to enter information into forms and select links to retrieve and view web pages. The media player application 710 configures the handset 600 to retrieve and play audio or audiovisual media. The JAVA applets 712 configure the handset 600 to provide games, utilities, and other functionality. In an embodiment, a maps application 714 may be provided to supply maps to the handset 600. In another embodiment, the maps may be accessed through the web browser 708.

Figure 8:
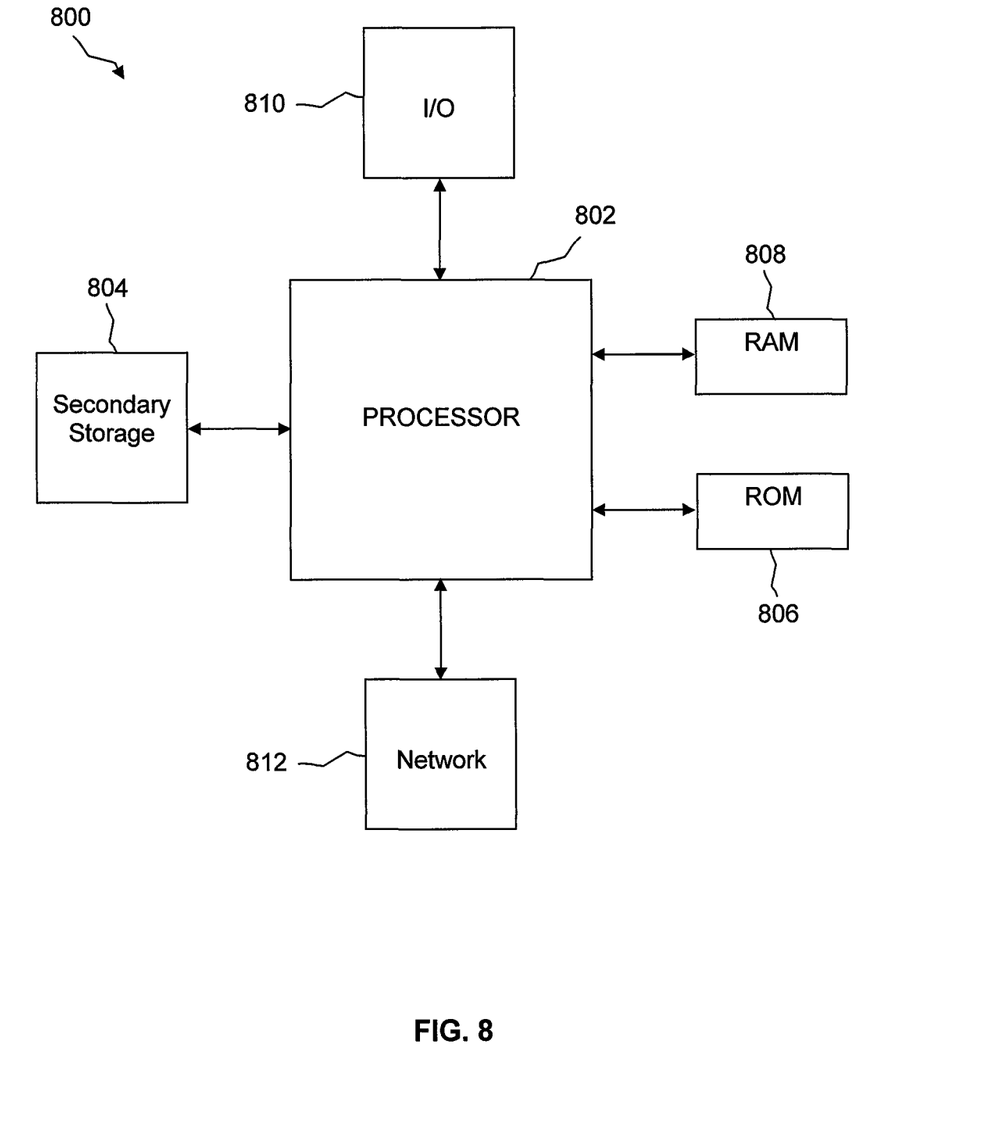
FIG. 8 illustrates an exemplary general purpose computer system suitable for implementing the several embodiments of the disclosure.

Portions of system 100 described above may be implemented on any general-purpose computer with sufficient processing power, memory resources, and network throughput capability to handle the necessary workload placed upon it. For example, the server 110 and the second device 104 may be implemented on a general-purpose computer. FIG. 8 illustrates a typical, general-purpose computer system suitable for implementing one or more embodiments disclosed herein. The computer system 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. The processor 802 may be implemented as one or more CPU chips.

The secondary storage 804 is typically comprised of one or more disk drives or tape drives and is used for non-volatile storage of data and as an over-flow data storage device if RAM 808 is not large enough to hold all working data. Secondary storage 804 may be used to store programs which are loaded into RAM 808 when such programs are selected for execution. The ROM 806 is used to store instructions and perhaps data which are read during program execution. ROM 806 is a non-volatile memory device which typically has a small memory capacity relative to the larger memory capacity of secondary storage. The RAM 808 is used to store volatile data and perhaps to store instructions. Access to both ROM 806 and RAM 808 is typically faster than to secondary storage 804.

I/O devices 810 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 812 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), Worldwide Interoperability Microwave Access (WiMAX), and/or global system for mobile communications (GSM) radio transceiver cards, and other well-known network devices. These network connectivity devices 812 may enable the processor 802 to communicate with an Internet or one or more intranets. With such a network connection, it is contemplated that the processor 802 might receive information from the network, or might output information to the network in the course of performing the above-described method steps. Such information, which is often represented as a sequence of instructions to be executed using processor 802, may be received from and outputted to the network, for example, in the form of a computer data signal embodied in a carrier wave Such information, which may include data or instructions to be executed using processor 802 for example, may be received from and outputted to the network, for example, in the form of a computer data baseband signal or signal embodied in a carrier wave. The baseband signal or signal embodied in the carrier wave generated by the network connectivity devices 812 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 802 executes instructions, codes, computer programs, scripts which it accesses from hard disk, floppy disk, optical disk (these various disk based systems may all be considered secondary storage 804), ROM 806, RAM 808, or the network connectivity devices 812.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A tracking and guidance system for providing directions to a mobile device comprising:
 a first mobile device configured to display a common map view and location of the first mobile device, and configured to transmit the common map view and location of the first mobile device to a second device; and
 the second device configured to receive and display the common map view and the location of the first mobile device, to receive user inputs comprising a user drawn directional data and a verbal directional data, and to transmit the user drawn directional data and the verbal directional data to the first mobile device;
 wherein the user drawn directional data and the verbal directional data are received by the first mobile device and the user drawn directional data is displayed on the common map view displayed by the first mobile device.

2. The system of claim 1, wherein the location of the first mobile device is determined by a global positioning system receiver of the first device.

3. The system of claim 1, wherein the first mobile device is selected from a group consisting of a cell phone, a personal data assistant, and a laptop computer.

4. The system of claim 3, wherein the first mobile device is in communication with a laptop and wherein the laptop displays the user drawn directional data on the map view displayed by the laptop.

5. The system of claim 1, wherein the location of the first mobile device is repeatedly updated on the common map view.

6. The system of claim 1, wherein the user drawn directional data comprises at least one of a route, a symbol, a landmark, and a guidepost.

7. The system of claim 1, wherein the user drawn directional data is provided by one of a mouse, a stylus pen, a touch pen, an electronic pen, an ultrasonic pen, an optical grid, a notepad, a tablet, a touch screen, and a touch pad.

8. The system of claim 1, wherein the common map view displayed by the first mobile device consists of substantially the same common map view displayed by the second device.

9. The system of claim 1, wherein the user drawn directional data is overlaid on the common map view displayed by the first mobile device.

10. The system of claim 1, wherein the user drawn directional data is coordinated with a navigation system.

11. A method of providing directions to a mobile user, the method comprising:
 receiving a location of a first device by a second device;
 displaying the location on a common map view displayed by the second device;
 receiving user inputs by the second device comprising a user drawn directional data on the common map view and a verbal directional data;
 transmitting the user drawn directional data and the verbal directional data from the second device to the first device; and
 displaying the user drawn directional data on the common map view displayed by the first device.

12. The method of claim 11, wherein the first device is selected from a group consisting of a cell phone, a personal data assistant, and a laptop computer.

13. The method of claim 11, wherein the location of the first device is occasionally updated on the common map view.

14. The method of claim 11, wherein the user drawn directional data comprises at least one of a route, a symbol, a landmark, and a guidepost.

15. The method of claim 11, wherein the user drawn directional data is harmonized with a navigation system.

16. A tracking and guidance system comprising:
 a database configured to store completed routes, travel times, and user feedbacks, wherein at least one of the completed routes is supplemented with user drawn directional data;
 a first terminal configured to transmit a location of the first terminal and a desired destination of the first terminal; and
 a server configured to receive the location of the first terminal and the desired destination of the first terminal, to retrieve a plurality of the completed routes from the database, to analyze at least portions of the plurality of the completed routes to determine a recommended route to the desired destination, and to transmit to the first terminal the recommended route to the desired destination;
 wherein the recommended route to the desired destination is received by the first terminal and displayed on a map view displayed by the first terminal and the first terminal provides user feedback about the recommended route to the server after the first terminal arrives at the desired destination.

17. The system of claim 16, wherein the location of the first device is determined by a global positioning system receiver of the first device.

18. The system of claim 16, wherein the first terminal is one of a cell phone, a personal data assistant, and a laptop computer.

19. The system of claim 16, wherein the completed routes are analyzed by the server according to the corresponding travel time of each completed route and the corresponding user feedback regarding each completed route.

20. The system of claim 16, wherein the recommended route to the desired destination combines portions of at least one of the completed routes.